US012655861B2

(12) United States Patent
Bente

(10) Patent No.: US 12,655,861 B2
(45) Date of Patent: Jun. 16, 2026

(54) TOLERANCE COMPENSATION DEVICE

(71) Applicant: WITTE Automotive GmbH, Velbert (DE)

(72) Inventor: Jan Bente, Sprockhövel (DE)

(73) Assignee: WITTE Automotive GmbH, Velbert (DE)

( * ) Notice: Subject to any disclaimer, the term of this patent is extended or adjusted under 35 U.S.C. 154(b) by 429 days.

(21) Appl. No.: 18/125,357

(22) Filed: Mar. 23, 2023

(65) Prior Publication Data

US 2023/0304519 A1 Sep. 28, 2023

(30) Foreign Application Priority Data

Mar. 24, 2022 (DE) .......................... 102022107018.2

(51) Int. Cl.
F16B 5/02 (2006.01)

(52) U.S. Cl.
CPC ............ F16B 5/025 (2013.01); F16B 5/0233 (2013.01)

(58) Field of Classification Search
CPC .... F16B 5/0216; F16B 5/0233; F16B 5/0241; F16B 5/025; F16B 5/0628; F16B 37/041; F16B 37/042; F16B 37/044; Y10T 403/75
USPC ........................................ 403/408.1
See application file for complete search history.

(56) References Cited

U.S. PATENT DOCUMENTS 3,605,846 A * 9/1971 Niel ...................... F16B 5/0233
411/970
4,969,065 A * 11/1990 Petri ..................... F16B 5/0233
411/80.1

5,106,225 A * 4/1992 Andre ................... F16B 5/0233
403/408.1
8,864,432 B2 * 10/2014 Figge ...................... F16B 5/025
411/383
2008/0038090 A1 2/2008 Figge
2012/0090146 A1 4/2012 Figge

FOREIGN PATENT DOCUMENTS

| DE | 4224575 | A1 | * | 3/1993 | ............ F16B 5/0233 |
| DE | 19839710 | A1 | * | 3/2000 | ............ F16B 5/0233 |
| DE | 20204994 | U1 | | 7/2002 | |
| DE | 202006012493 | U1 | | 11/2006 | |
| DE | 202008011318 | U1 | | 11/2008 | |

(Continued)

OTHER PUBLICATIONS

"INTEGRAL Definition and Meaning." Merriam-Webster. [online], [retrieved on Dec. 16, 2025]. Retrieved from the Internet <URL: https://www.merriam-webster.com/dictionary/integral>.*

(Continued)

*Primary Examiner* — Josh Skroupa
(74) *Attorney, Agent, or Firm* — Dickinson Wright PLLC

(57) ABSTRACT

A device for compensating tolerances between two components to be braced by means of a screw element. The device includes a base element and a compensating element that can be moved out of the base element. The base element and the compensating element form a passage, defining an axial direction, for the screw element. The device also includes a fastening nut for the screw element. The device further includes a connecting element that connects the fastening nut to the base element and serves to premount the device on a first of the components to be connected.

21 Claims, 5 Drawing Sheets

(56) References Cited

FOREIGN PATENT DOCUMENTS

| | | | | | |
|----|----|----|----|----|----|
| DE | 102009056144 | B4 | * | 6/2014 | ............ F16B 37/068 |
| DE | 102013016359 | A1 | * | 7/2014 | ............ F16B 5/0628 |
| DE | 102016106006 | A1 | * | 10/2017 | ............ F16B 5/0628 |
| DE | 102017100442 | A1 | | 7/2018 | |
| FR | 3114133 | A1 | * | 3/2022 | ............ F16B 5/0233 |
| SU | 1244403 | A2 | * | 7/1986 | ............ F16B 19/109 |

OTHER PUBLICATIONS

Translation of Examination Notification dated Jan. 18, 2023 corresponding to DE 10 2022 107 018.2, 12 pages.

* cited by examiner

TOLERANCE COMPENSATION DEVICE

This application claims the priority of German Patent Application 102022107018.2, filed on Mar. 24, 2022, which is incorporated herein by reference in its entirety.

The present invention relates to a device for compensating tolerances between two components to be braced by means of a screw element, comprising a base element; a compensating element that can be moved out of the base element, wherein the base element and the compensating element form a passage, defining an axial direction, for the screw element; a fastening nut for the screw element; and a connecting element that connects the fastening nut to the base element and serves to premount the device on a first of the components to be connected.

Such a tolerance compensation device is known in principle. The base element and the compensating element are usually in a left-hand thread engagement, while the screw element has a right-hand external thread. A spring element is arranged in the compensating element, which spring element produces a frictional connection between the screw element extending through the passage and the compensating element. If the screw element for screwing the components is guided through the components and the tolerance compensation device and screwed into the fastening nut, the compensating element rotates out of the base element due to the frictional connection until it abuts against the second component and the distance between the components is bridged by the tolerance compensation device.

Since the fastening nut is connected to the base element via the connecting element, i.e., is integrated in the tolerance compensation device, the tolerance compensation device must conventionally be pushed laterally onto the first component for premounting thereon. However, pushing the tolerance compensation device laterally onto the component in such a way is not always possible, for example, due to lack of installation space. In this case, the mounting of the fastening nut must take place separately, as a result of which the premounting of the tolerance compensation device on the component is associated with additional assembly steps and thus increased expenditure of time and costs.

The object of the invention is to provide a tolerance compensation device of the type mentioned at the outset, which can also be premounted on a component in an economical manner when no lateral access is provided.

The object is achieved by a tolerance compensation device with the features of claim 1.

The invention is based on the general idea of not pushing the tolerance compensation device with an integrated fastening nut laterally onto the first component for premounting thereon as usual up to now but inserting it into the first component in the axial direction in a similar manner to tolerance compensation devices without integrated fastening nuts. In this way, the tolerance compensation device with integrated fastening nut can also be premounted on the first component in a simple manner when no lateral access is provided.

It is understood that the first component has to have a mounting opening for receiving the tolerance compensation device, which mounting opening is dimensioned such that a lower part of the connecting element carrying the fastening nut can be guided axially through the mounting opening, while an upper portion of the connecting element facing the base element comes to rest on an edge region of the first component which delimits the mounting opening. For this purpose, the lower part of the connecting element ideally has a maximum dimension in the radial direction that is less than a maximum radial dimension of the upper portion of the connecting element. In order to nevertheless enable a desired bracing of the components to be braced, the connecting element according to the invention forms a support means, by means of which the fastening nut can be supported axially on the first component in the braced state of the components in spite of the mounting opening.

Advantageous embodiments of the invention can be found in the dependent claims, the description and the drawing.

According to a structurally particularly simple and thus cost-effective embodiment, the connecting element and the fastening nut are formed integrally with one another. For example, the connecting element can have a sheet material, for example a metal sheet, and in particular can be a punched/bent part.

For a particularly simple assembly of the tolerance compensation device, the connecting element can be attached, in particular clipped, to the base element or to a holding element holding the base element. For example, the connecting element can form at least one latching opening for receiving a corresponding latching lug of the base element or holding element.

In order to prevent the tolerance compensation device premounted on the first component from being able to be inadvertently detached from the first component, the connecting element, according to one embodiment, forms at least two latching arms which extend in the direction of the base element, can be pressed radially inward against a restoring force, and engage behind the first component in the premounted state. In other words, the tolerance compensation device can be clipped into the first component in the axial direction and can thus be premounted thereon in a particularly simple manner.

According to a further embodiment, the latching arms are formed such that they are axially supported on the first component in the braced state of the components. In this way, the latching arms thus fulfill a dual function in that they not only secure the tolerance compensation device to the first component in the premounted state but also contribute to the bracing of the components.

According to yet another embodiment, the connecting element can be deformed by tightening the screw element in the fastening nut, in particular in order to bring the latching arms into a position in which they are supported axially on the first component.

According to a variant of the tolerance compensation device, the fastening nut is arranged in a region of the connecting element facing the base element.

In this case, the connecting element can comprise two stop tabs forming the latching arms, the free ends of which are arranged in front on a side of the fastening nut facing away from the base element, in order to be pressed apart by the screw element passing through the fastening nut.

The stop tabs can each protrude from the fastening nut, in particular from an axial end of the fastening nut facing the base element, and have a longitudinal portion which extends at least approximately axially and transitions into a transverse portion extending transversely, in particular at right angles, to the axial direction.

The latching arms can protrude from the transverse portions and extend obliquely outward relative to the longitudinal portions.

According to one embodiment, end regions of transverse portions of the stop tabs extending transversely, in particular at right angles, to the axial direction can overlap, in particular in a region in front of the passage of the fastening nut.

Alternatively, end regions of transverse portions of the stop tabs extending transversely, in particular at right angles, to the axial direction can be bent away from the fastening nut in the axial direction and define a gap between them, the width of which gap is smaller than the width of a passage of the fastening nut. This comparatively small width of the gap ensures that the stop tabs are pressed apart sufficiently far by the screw element passing through the fastening nut, in order to bring the latching arms into their supporting position. For example, the width of the gap can lie in the range of one fifth to one half of the width of the passage of the fastening nut.

According to a further variant of the tolerance compensation device, the fastening nut is arranged in a region of the connecting element facing away from the base element.

In this case, the connecting element can have a bellows-like deformation portion which is arranged between the base element and the fastening nut.

The latching arms can protrude from the deformation portion in the region of the fastening nut and extend obliquely outward relative to the axial direction in the direction of the base element.

The deformation portion can be deformable by tightening the screw element in the fastening nut such that a part of the deformation portion facing the base element comes to rest on the first component.

The invention is described below purely by way of example using possible embodiments with reference to the drawing. In the drawings.

Figures 1A, 1B, 1C, 1D:
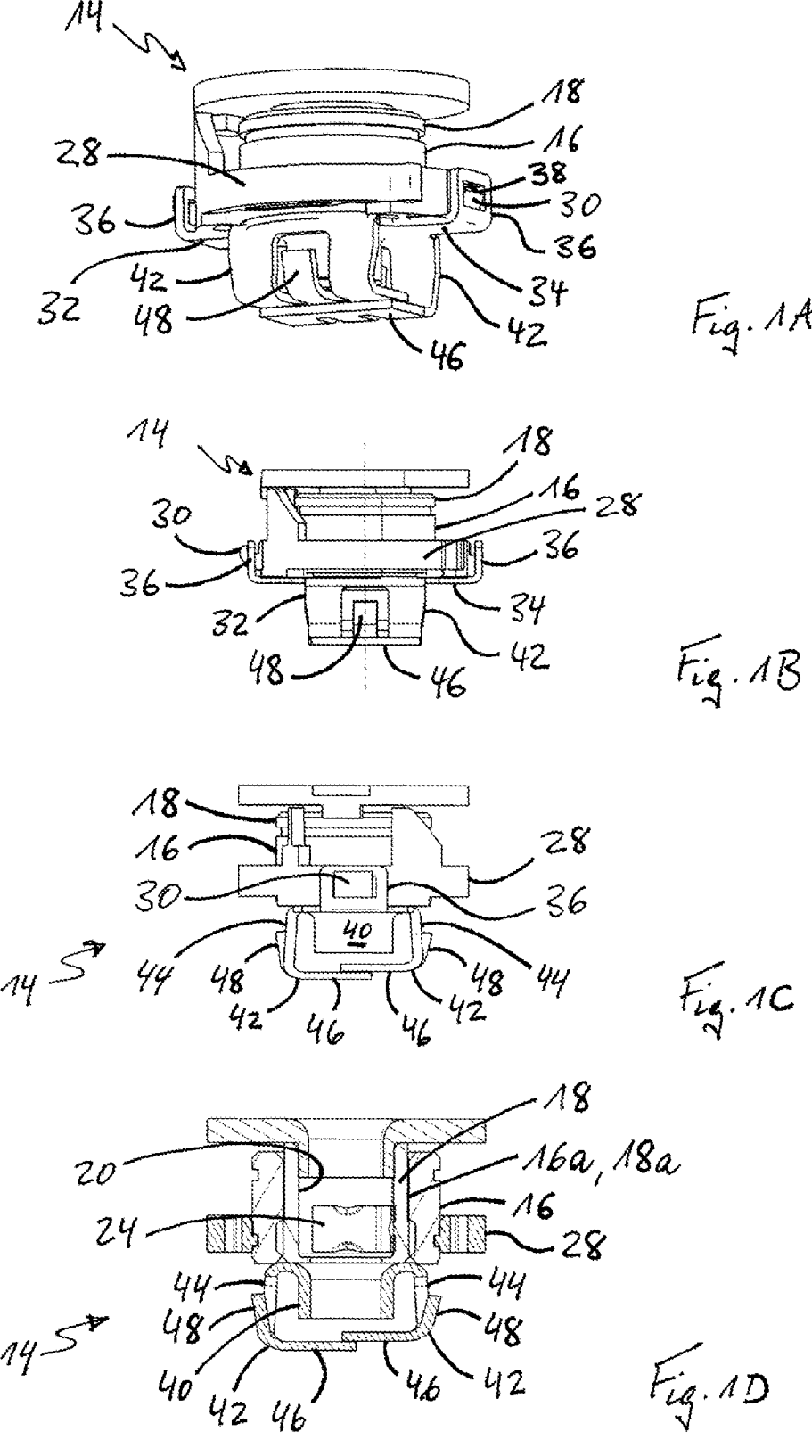
FIG. 1A shows a perspective view of a tolerance compensation device according to a first embodiment.
FIG. 1B shows a first side view of the tolerance compensation device from FIG. 1A.
FIG. 1C shows a second side view, rotated by 90°, of the tolerance compensation device from FIG. 1A.
FIG. 1D shows a sectional view of the tolerance compensation device from FIG. 1C.
Figures 1E, 1F, 1G:
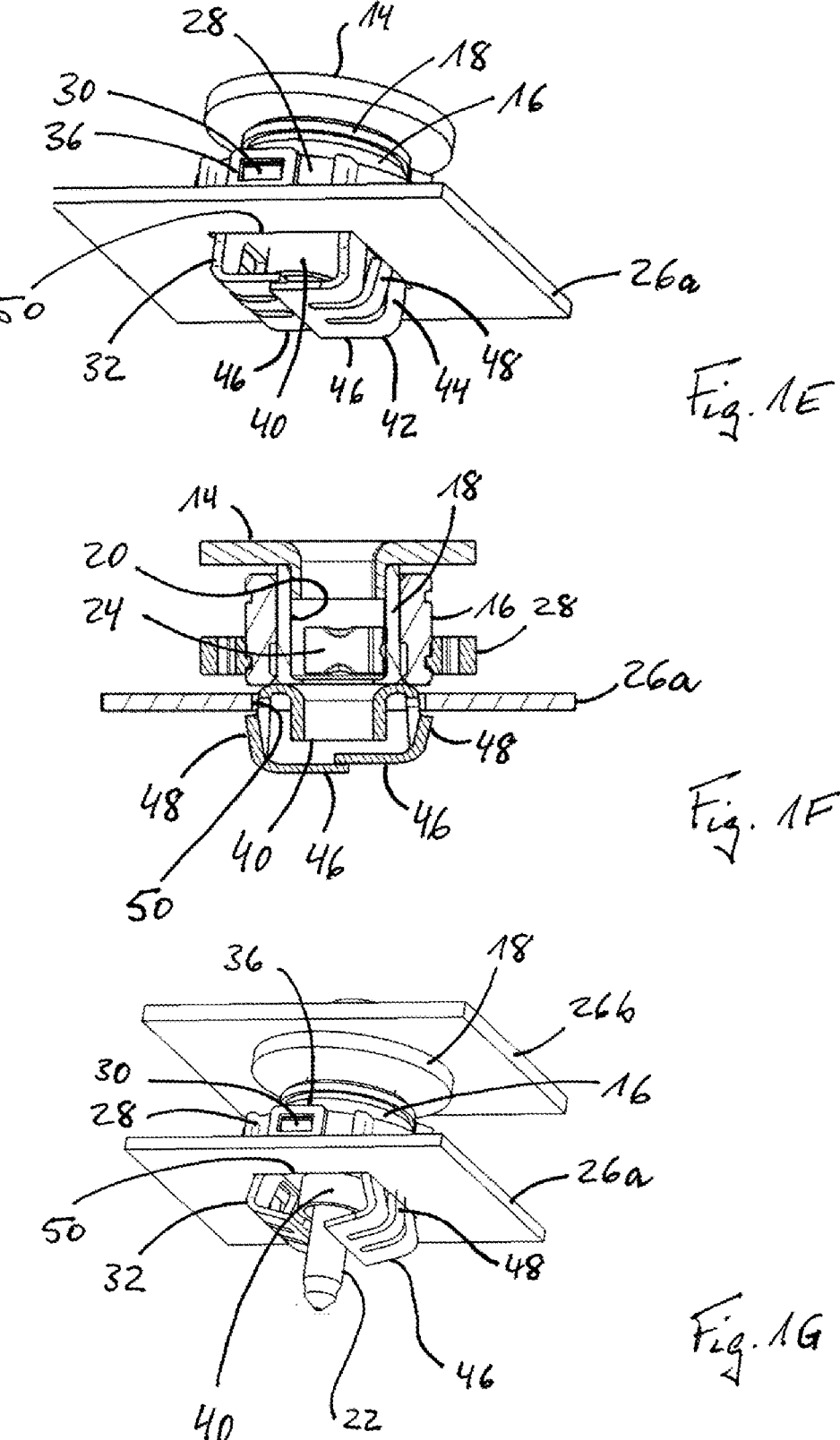
FIG. 1E shows a perspective view of the tolerance compensation device from FIG. 1A in a state mounted on a first component.
FIG. 1F shows a sectional view of the tolerance compensation device from FIG. 1E.
FIG. 1G shows a perspective view of the tolerance compensation device from FIG. 1A with two braced components.
Figure 1H:
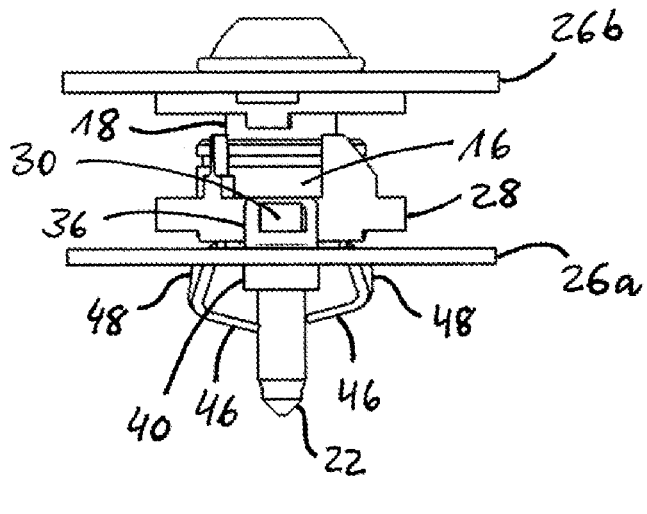
FIG. 1H shows a side view of the tolerance compensation device from FIG. 1G.
Figure 1J:
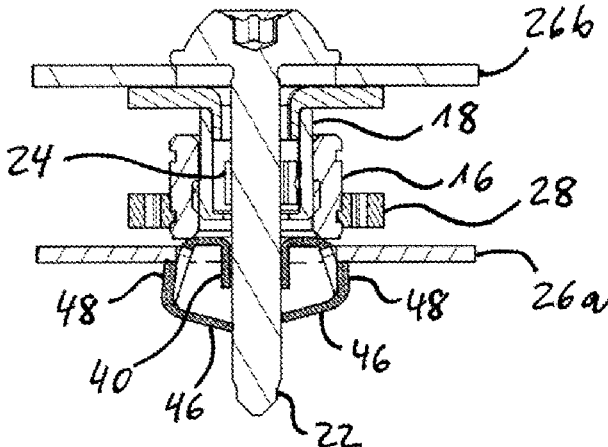
FIG. 1J shows a sectional view of the tolerance compensation device from FIG. 1G.

FIG. 1A to 1J shows a tolerance compensation device 14 according to a first embodiment. The tolerance compensation device 14 comprises a base element 16 and a compensating element 18 which is in left-hand thread engagement therewith. For this purpose, the base element 16 forms a left-hand internal thread 16a, while the compensating element 18 has a correspondingly formed external thread 18a. The thread axes of the internal thread 16a and of the external thread 18a define an axial direction.

The base element 16 and the compensating element 18 form a passage 20, extending in the axial direction, for a screw element 22. A spring element 26a is inserted into the part of the passage 20 defined by the compensating element 18, said spring element being provided for producing a frictional connection between the screw element 22 extending through the passage 20 and the compensating element 18.

The screw element 22 serves to brace two components 26a, 26b arranged at a distance from one another, of which the lower one in the figures is referred to here as the first component 26a and the upper one is referred to as the second component 26b.

The base element 16 is held in a holding ring 28, which forms two opposing latching lugs 30 projecting radially outward. The latching lugs 30 serve to attach a connecting element 32 provided for premounting of the tolerance compensation device 14 on the first component 26a. The connecting element 32 here is a punched/bent part formed from a metal sheet, which part comprises an upper portion 34 which extends transversely and in particular at right angles to the axial direction and from which two latching tabs 36 extending outward in opposite directions protrude, said latching tabs each being bent upward in the axial direction, i.e., in the direction of the compensating element 18, and each forming a latching opening 38 for receiving one of the latching lugs 30. In other words, the connecting element 32 is clipped onto the holding ring 28 by means of the latching lugs 30 engaging in the latching openings 38.

The upper section 34 of the connecting element 32 further forms a fastening nut 40, which is aligned with the passage 20, extends away from the base element 16, thus downward in the figures, and into which the screw element 22 can be screwed for bracing the components 26a, 26b.

Furthermore, two stop tabs 42, which are arranged opposite one another and are offset by 90° from the latching tabs 36, protrude from the upper portion 40 of the connecting element 32, which stop tabs are bent away from the base element 16, i.e., downward in the figures, and define a lower part of the connecting element 32 with a substantially rectangular cross-section. A maximum dimension of the lower part of the connecting element 32 in the radial direction is smaller than a maximum radial dimension of the upper portion 40.

The stop tabs 42 each have a longitudinal portion 44 which extends at least approximately axially and transitions into a transverse portion 46 extending transversely, in particular at right angles, to the axial direction. The transverse portions 46 face one another so that the stop tabs 42 form a cage, so to speak, for the fastening nut 40. In the embodiment shown in FIG. 1A to 1J, the end regions of the transverse portions 46 overlap, but only to the extent that the transverse portions 46 and thus the stop tabs 42 can be pressed apart as a whole by the screw element 22 when the screw element 22 has been screwed into the fastening nut 40 so far that the screw element 22 projects through the fastening nut 40 and comes into contact with the transverse portions 46.

A latching arm 48 extending away from the respectively other transverse portion 46 protrudes from each transverse portion 46, which latching arm is bent in the direction of the base element 16, i.e., upward in the figures, and extends not exactly in the axial direction but obliquely thereto so that it projects outward beyond the associated longitudinal portion 44.

As already mentioned, the connecting element 32 not only forms the fastening nut 40 but also serves to premount the tolerance compensation device on the first component 26a. For this purpose, the first component 26a has a substantially rectangular mounting opening 50, the contour of which is adapted to the lower part of the connecting element 32 so that the lower part of the connecting element 32 can be inserted in a torsion-proof manner into the mounting opening 50, while the upper portion 34 comes to lie on the first component 26a. The projection of the latching arms 48 beyond the longitudinal portions 44 or the inclination of the latching arms 48 relative to the longitudinal portions 44 is selected such that they engage behind the first component 26a in the premounted state, i.e., when the tolerance compensation device 14, more precisely the connecting element 32 thereof, is inserted into the mounting opening 50 of the first component 26a, in order to secure the tolerance compensation device 14 to the first component 26a. In other words, the tolerance compensation device 14 is simply dipped axially into the mounting opening 50 for premounting on the first component 26a.

If the components 26a, 26b are braced together by the screw element 22, which is guided from above in the figures through the components 26, 26b and the tolerance compensation device 14, and the stop tabs 42 are pressed apart by the screw element 22 passing through the fastening nut 40, the free ends of the latching arms 48 come into contact with the first component 26a due to the displacement of the stop tabs 42. In this case, the inclination of the latching arms 48 relative to the longitudinal portions 44 of the stop tabs is ideally selected such that the latching arms 48 are supported in the braced state of the components 26a, 26b at least approximately axially on the first component 26a in order to thus optimally transmit the axial force exerted on the fastening nut 40 by the screw element 22 to the first component 26a. In the braced state of the components 26a, 26b, the first component 26a is consequently damped between the upper portion 34 and the latching arms 48.

Figure 2:
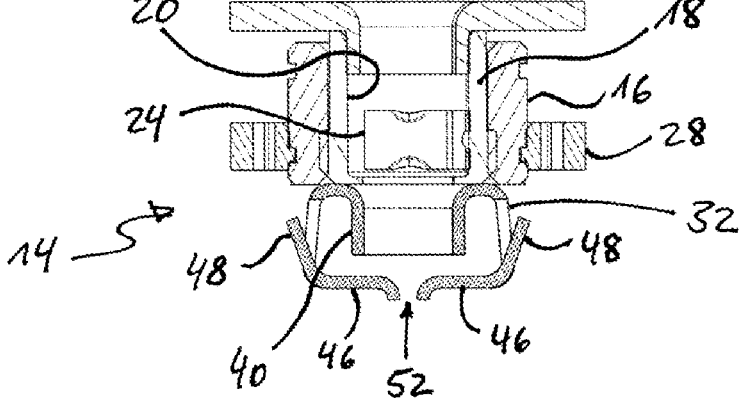
FIG. 2 shows a sectional view of a tolerance compensation device according to a second embodiment.

In FIG. 2, a second embodiment of a tolerance compensation device 14 is shown, which differs from the first embodiment described above only in that the end regions of the transverse portions 46 of the stop tabs 42 do not overlap here but are instead bent downward in the axial direction in order to define between them a gap 52, into which the screw element 22 can penetrate when the components 26a, 26b are braced in order to press the stop tabs 42 apart from one another and thereby bring the latching arms 48 to rest on the first component 26a. In order to enable a sufficient displacement of the stop tabs 42, the gap 52 can have a width which is approximately 0.2-0.5 times as large as an inner diameter of the fastening nut 40 or an outer diameter of the screw element 22.

Figures 3A, 3B, 3C, 3D:
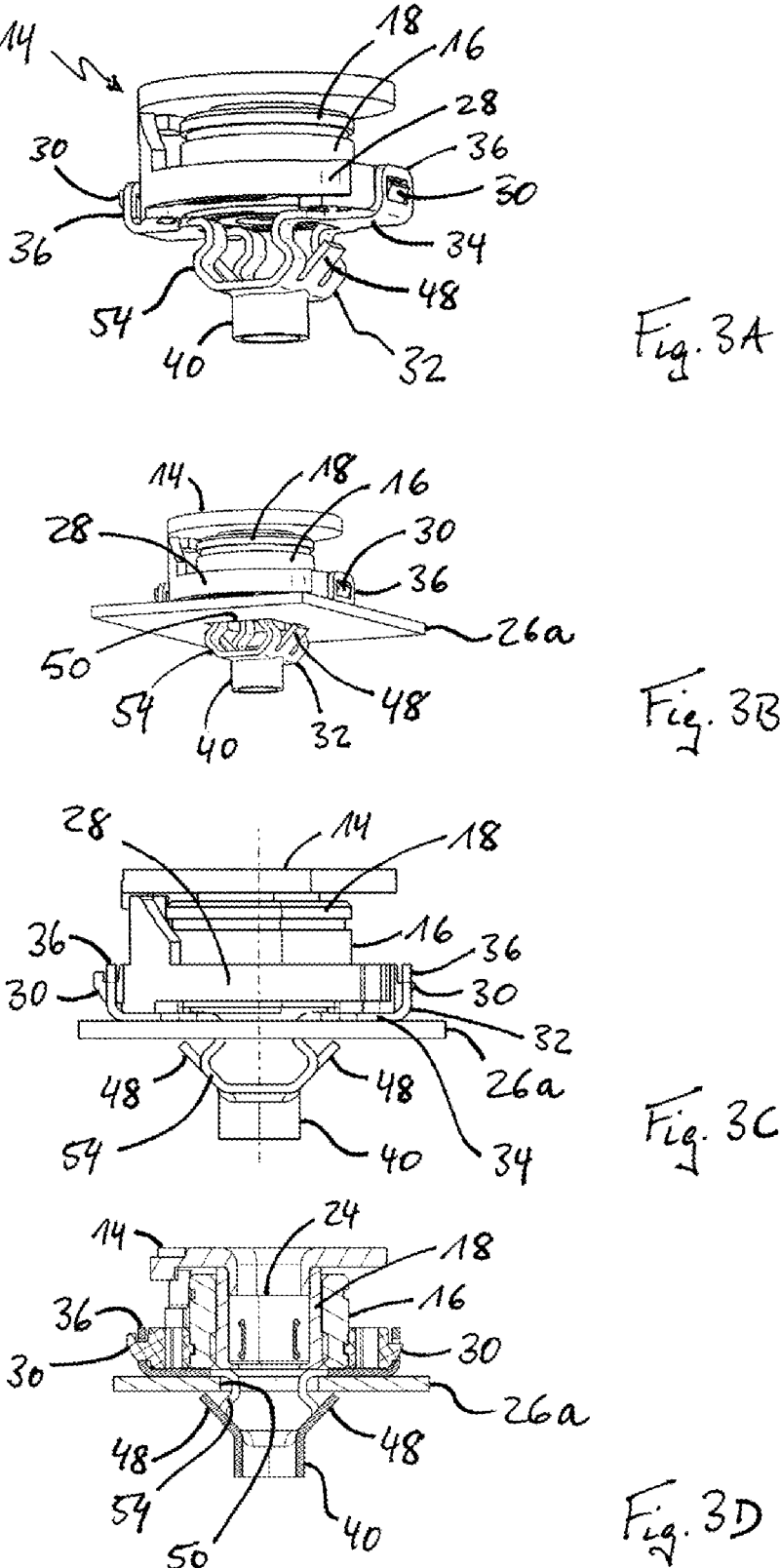
FIG. 3A shows a perspective view of a tolerance compensation device according to a third embodiment.
FIG. 3B shows a perspective view of the tolerance compensation device from FIG. 3A in a state premounted on a first component.
FIG. 3C shows a side view of the tolerance compensation device from FIG. 3B.
FIG. 3D shows a sectional view of the tolerance compensation device from FIG. 3B.
Figure 3E:
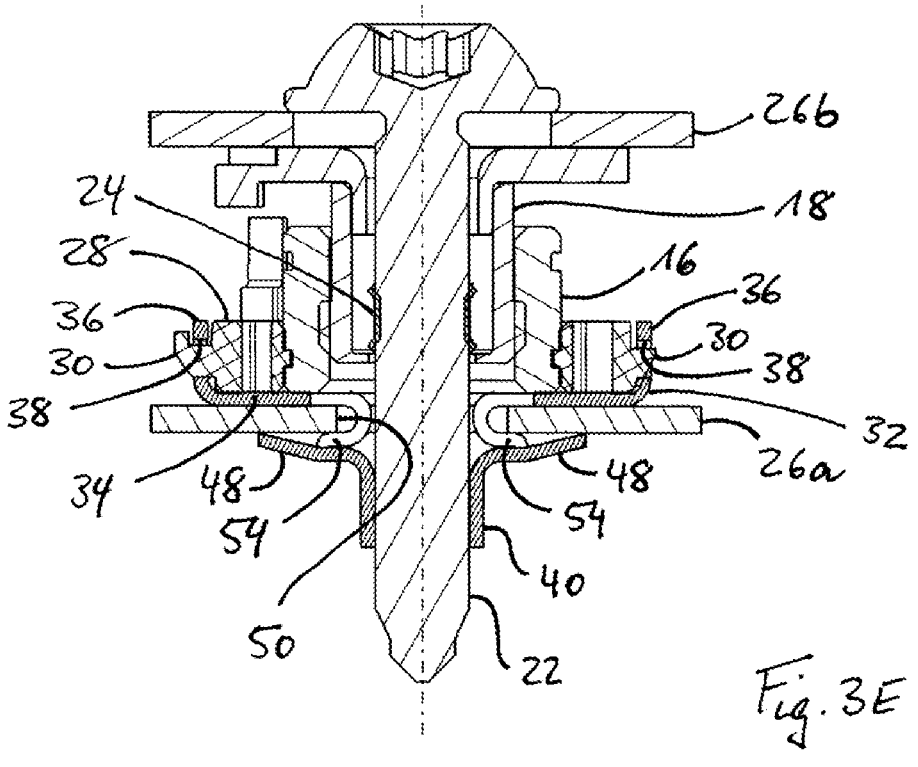
FIG. 3E shows a sectional view of the tolerance compensation device from FIG. 3A with two braced components.
Figure 3F:
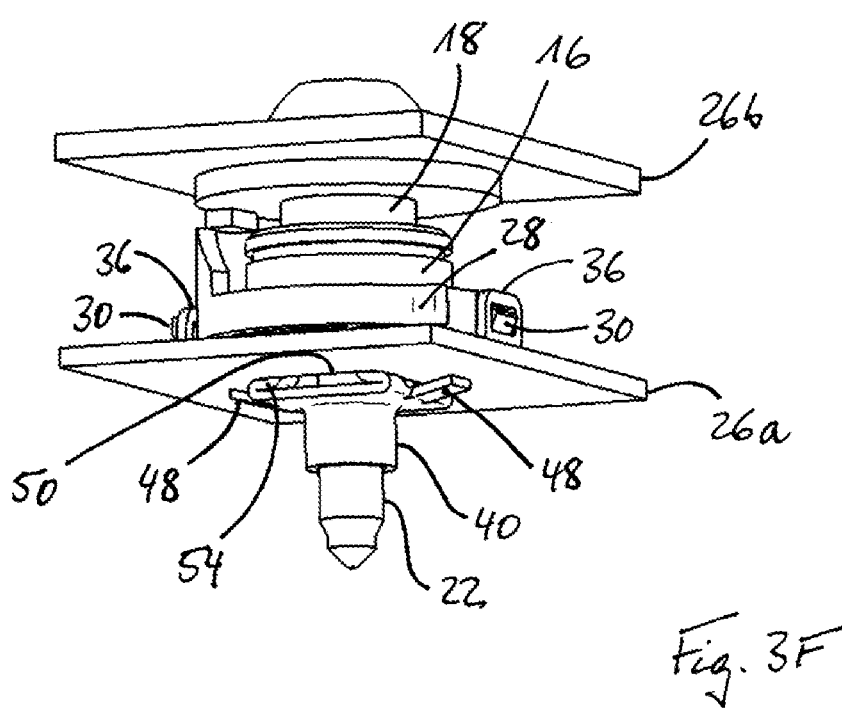
FIG. 3F shows a perspective view of the tolerance compensation device from FIG. 3E.

FIG. 3 shows a third embodiment of a tolerance compensation device 14, which differs from the embodiments described above in the formation of the lower part of the connecting element 32. Specifically, the fastening nut 40 here does not protrude from the upper portion 34 but is connected to the upper portion 34 by a bellows-like deformation portion 54 which extends away from the base element 16, i.e., downward in the figures. The latching arms 48 protrude from the deformation portion 54 in the region of the fastening nut 40 and extend obliquely outward relative to the axial direction in the direction of the base element 16. As previously, the latching arms 48 are dimensioned and inclined outward such that they engage behind the first component 26a when the tolerance compensation device 14 is clipped into the mounting opening 50 in the premounted state.

In order to brace the components 26a, 26b, the screw element 22 is screwed from above in the figures into the fastening nut 40, and the fastening nut 40 is thereby pulled in the direction of the first component 26b, i.e., upward in the figures, under deformation of the deformation portion 54. Here, the deformation portion 54 is axially compressed and radially widened. In this case, the deformation portion 54 is dimensioned such that, in the maximally compressed state, it has such a large dimension in the radial direction that it comes to rest on an edge region of the first component 26a that delimits the mounting opening 50, in order to support the fastening nut 40 in the braced state of the components 26a, 26b on the first component 26a and to ensure that the first component 26a is clamped between the upper portion 34 and the deformation portion 54. Simultaneously with the compression of the deformation portion 54, the latching arms 48 are also brought to rest on the first component 26a and spread outward.

LIST OF REFERENCE SIGNS

14 Tolerance compensation device
16 Base element
16a Internal thread
18 Compensating element
18a External thread
20 Passage
22 Screw element
24 Spring element
26a First component
26b Second component
28 Holding ring
30 Latching lug
32 Connecting element
34 Upper portion
36 Latching tab
38 Latching opening
40 Fastening nut
42 Stop tab
44 Longitudinal portion
46 Transverse portion
48 Latching arm
50 Mounting opening
52 Gap
54 Deformation portion

The invention claimed is:

1. A device for compensating tolerances between two components to be braced by means of a screw element, comprising:
   a base element;
   a compensating element that can be moved out of the base element, wherein the base element and the compensating element form a passage, defining an axial direction, for the screw element; a fastening nut for the screw element, wherein the base element and the compensating element are in threaded engagement, wherein the axial direction is defined by thread axes of threads of the base element and the compensating element; and
   a connecting element that connects the fastening nut to the base element and serves for premounting of the device on a first of the components to be connected, wherein the connecting element can be inserted into the first component in the axial direction and in the braced state of the components forms a support means for supporting the fastening nut on the first component, and wherein the connecting element is clipped to the base element or to a holding element holding the base element, wherein the connecting element and the fastening nut are formed as a sing-piece with one another.

2. The device according to claim 1,
wherein the connecting element forms at least one latching opening for receiving a corresponding latching lug of the base element or of the holding element.

3. The device according to claim 1,
wherein the connecting element forms at least two latching arms which extend in the direction of the base element, can be pressed radially inward against a restoring force, and engage behind the first component in the premounted state.

4. The device according to claim 3,
wherein the latching arms are formed such that they are axially supported on the first component in the braced state of the components.

5. The device according to claim 1,
wherein the connecting element can be deformed by tightening the screw element in the fastening nut.

6. The device according to claim 5,
wherein the connecting element can be deformed in order to bring latching arms of the connecting element into a position in which they are supported axially on the first component.

7. The device according to claim 1,
wherein the fastening nut is arranged in a region of the connecting element facing the base element.

8. The device according to claim 7,
wherein the connecting element comprises two stop tabs forming latching arms, the free ends of said stop tabs being arranged in front on a side of the fastening nut facing away from the base element, in order to be pressed apart by the screw element passing through the fastening nut.

9. The device according to claim 8,
wherein the stop tabs each protrude from the fastening nut and have a longitudinal portion which extends at least approximately axially and transitions into a transverse portion extending transversely to the axial direction.

10. The device according to claim 9,
wherein the stop tabs each protrude from an axial end of the fastening nut facing the base element.

11. The device according to claim 9,
wherein the transverse portion extends at right angles to the axial direction.

12. The device according to claim 9,
wherein the latching arms protrude from the transverse portions and extend obliquely outward relative to the longitudinal portions.

13. The device according to claim 9,
wherein end regions of transverse portions of the stop tabs extending transversely to the axial direction overlap.

14. The device according to claim 13,
wherein the end regions of transverse portions of the stop tabs extend at right angles.

15. The device according to claim 13,
wherein the end regions extend transversely in a region in front of the passage of the fastening nut.

16. The device according to claim 9,
wherein end regions of transverse portions of the stop tabs extending transversely to the axial direction are bent away from the fastening nut in the axial direction and define a gap between them, the width of said gap being smaller than that of a passage of the fastening nut.

17. The device according to claim 16,
wherein the end regions extend at right angles.

18. The device according to claim 1,
wherein the fastening nut is arranged in a region of the connecting element facing away from the base element.

19. The device according to claim 18,
wherein the connecting element has a bellows-like deformation portion which is arranged between the base element and the fastening nut.

20. The device according to claim 18,
wherein the latching arms protrude from the deformation portion in the region of the fastening nut and extend obliquely outward relative to the axial direction in the direction of the base element.

21. The device according to claim 18,
wherein the deformation portion can be deformed by tightening the screw element in the fastening nut such that a part of the deformation portion facing the base element comes to rest on the first component.

* * * * *